Jan. 5, 1965 S. WESTIN 3,163,954
FISHING APPARATUS WITH AUTOMATIC BOBBING MECHANISM
Filed June 13, 1962
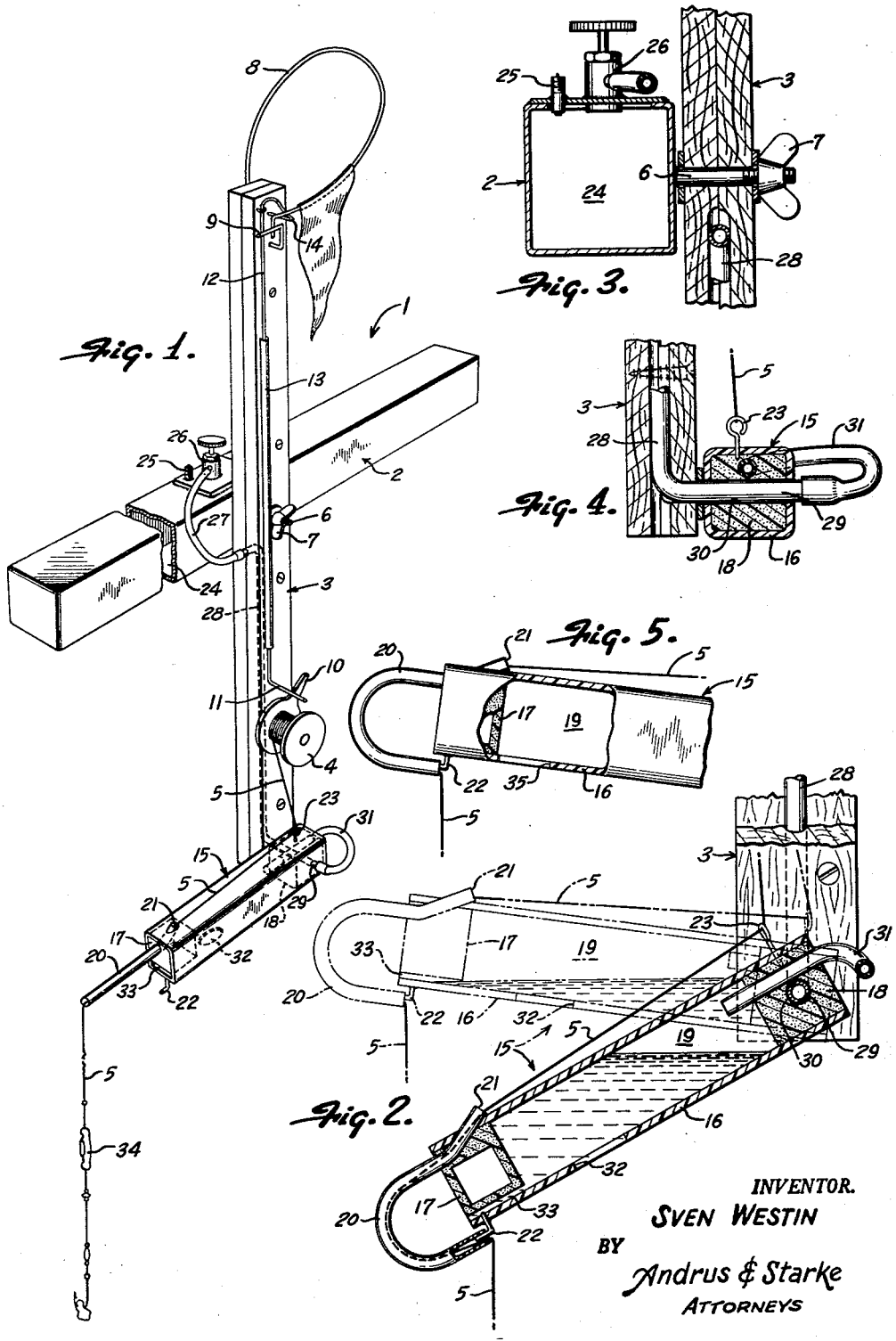
INVENTOR.
SVEN WESTIN
BY
Andrus & Starke
ATTORNEYS United States Patent Office 3,163,954
Patented Jan. 5, 1965

3,163,954
FISHING APPARATUS WITH AUTOMATIC
BOBBING MECHANISM
Sven Westin, P.O. Box 505, Elm Grove, Wis.; Ludmilla
Westin, executrix of said Sven Westin, deceased
Filed June 13, 1962, Ser. No. 202,115
10 Claims. (Cl. 43—17)

This invention relates to fishing apparatus and more particularly to means for automatically jiggling or bobbing the fishing line. While the apparatus is particularly suited for use in ice fishing apparatus and is described accordingly herein, it is, of course, applicable to all forms of still fishing.

Where permitted, fishermen customarily employ more than one ice fishing apparatus at a given time in their efforts to secure or land fish. While it is generally considered to be advantageous to jiggle or bob the fishing line in an effort to better attract fish, such attentions can at best be given to but one line at a given time by the avid fisherman. And for the fisherman who prefers the comforts of a shelter or the sociability of a neighboring fisherman, even one line will receive little such attention.

Fishing apparatus with automatic jiggling or bobbing means have been commercially available, but have not received wide acceptance. Some such apparatus have wind operated bobbing means making their operation unreliably dependent on weather conditions. Others have electrically operated bobbing means involving relatively complicated and costly mechanism. In most of these prior fishing apparatus the automatic bobbing mechanism stopped operating in the event of freezing of the water at the hole in the ice.

In carrying out the present invention, instead of employing the mechanical actuators of the past, the fish line is secured to float means to which a supply of gas is connected, and means are provided to intermittently displace an amount of the gas in the float by water to alternately effect lowering and raising of the float in the water.

The invention is illustrated in a device in which the float is pivotally attached to a fixed support, although other float structures may be employed.

The drawings furnished herewith illustrate the best mode for carrying out the invention as presently contemplated and set forth hereinafter.

In the drawings:

FIGURE 1 is a perspective view of an ice fishing apparatus and includes the automatic bobbing means of this invention with the fishing line released from its securement.

FIG. 2 is an enlarged partial elevational view in section showing details of one embodiment of the fishing line bobbing mechanism of this invention and further shows the oscillating arm or float member pivoted to a lowered position and in phantom shows the arm pivoted to a raised position;

FIG. 3 is an enlarged broken sectional view taken generally at the pivot between the cross arm and support member of the ice fishing apparatus and shows the valving for the gas supply reservoir;

FIG. 4 is an enlarged sectional view taken generally on the axis of pivot for the oscillating arm or float member; and FIG. 5 is an enlarged partial elevational view with parts broken away and sectioned of the arm or pivot member showing another embodiment of the invention.

Referring to the drawings, the invention is shown to be employed on one form of portable, foldable ice fishing apparatus 1 having a cross arm 2 which is adapted to extend over a fishing hole in the ice, not shown, to provide support for the generally vertical support member 3. In service the member 3 extends through the hole in the ice and into the water and supports a rotary reel 4 for the fishing line 5 beneath the surface of the water. The cross arm 2 and member 3 are pivotable relative to each other on the pin 6 to provide for folding to parallel positions alongside of each other for easy portability. Means such as a wing nut 7 may be threaded on the end of pin 6 to secure the arm 2 and support member 3 in their respective positions for service and for carrying.

A spring-like flexible signal member 8 has one end thereof fixedly secured at the upper end of the support member 3 and extends upwardly therefrom where it is readily visible to the fisherman. When the tip-up is placed in service, the other or free end of member 8 is doubled over and is releasably disposed behind a generally horizontal pin 9 carried by support member 3 on the reel side of the support member.

The flexible member 8 is released from its securement behind pin 9 in response to reeling out of fishing line as would be effected by a fish. This may be accomplished through a radial projection 10 on reel 4 which is engageable with projection 11 extending into the path of the reel projection from the elongated vertical member 12 rotatably supported along the reel side of member 3 within the bearing element 13. The rotatable member 12 carries a second projection 14 at the upper end thereof which extends over the pin 9 and is engageable with the releasably held end of signal member 8 upon rotation of member 12 by the reel to push the signal member to one side and out of engagement with pin 9 so it can spring upwardly to indicate a strike.

According to this invention, the tip-up 1 is provided with means for automatically jiggling or bobbing the fishing line 5 to better attract fish and includes a float member 15 which carries the fishing line and is pivotally connected to the support member 3 for pivotal oscillating motion below the surface of the water. As shown in the drawings, the float member 15 comprises an arm pivotally connected adjacent the lower end of support member 3. The arm or float member 15 comprises a generally rectangular section sleeve 16 the end portions of which are closed by plug elements 17 and 18 respectively to define a chamber 19 therebetween.

Means are provided for releasably securing the fishing line 5 to prevent the reel 4 from being actuated by the up and down oscillating motion of the arm or float member 15. As shown in the drawings the releasable line securement means includes a tubular member 20 which extends through the upper side of sleeve 16 and projects longitudinally from the end of plug element 17. The fishing line 5 extends through member 20 with the line coming from reel 4 entering member 20 at the upwardly opening end 21. The portion of tubular member 20 projecting from plug element 17 is flexible and resilient and is doubled over to be slidably received by the pin 22 provided on the underside of the float member. The slidable connection between tubular member 20 and pin 22 involves a relatively slight force fit capable of securing the line therebetween to withstand repetitive bobbing motion of the line but is releasable in response to a tug or pull on the line as would be caused by a fish to thereby effect actuation of reel 4 and release of the signal member 8.

Any amount of slackness may be provided in the fishing line 5 between reel 4 and the line securement of pin 22. Slackness in the line, however, may result in entanglements with the bobbing mechanism giving rise to malfunction. For this reason it is generally preferred to keep slackness in the line at a minimum and to this end the line 5 passes through an eyelet 23 mounted on arm 15 at or closely adjacent to the axis of pivot for the arm. With the line between the reel 4 and the line securement at pin 22 extending through eyelet 23, bobbing or oscillating motion of the arm or float member 15 is accommodated without effecting accidental actuation of the reel under minimum slack conditions.

In the fishing apparatus shown in the drawings the cross arm 2 is hollow and constitutes a reservoir 24 for air or other gas under pressure which communicates with chamber 19 in the arm or float member 15. The cross arm reservoir 24 is provided with a fill valve 25 of a type making it possible to fill the reservoir at a gasoline station air supply or with an ordinary tire air pump. The reservoir 24 further includes an adjustable outlet valve 26 so the flow of gas to chamber 19 may be precisely controlled. A short length of flexible tubing 27 connects valve 26 with conduit 28 extending generally downwardly within the support member 3 and permits the fishing apparatus to be folded for portability without dismantling the pressure line. Adjacent to the lower end of support member 3 the conduit 28 makes a generally right angle bend and a projecting conduit portion 29 extends outwardly from member 3. Conduit portion 29 extends through transverse opening 30 through the sleeve and plug element 18 and provides the pivot mounting for floating member 15. The pressure supply system from reservoir 24 to chamber 19 is completed by flexible tubing portion 31 which slips onto the end of conduit portion 29 with a force fit and extends around to the end of arm 15 and through plug element 18 into chamber 19. The force fit securement between conduit portion 29 and flexible tubing 31 also serves to retain the float member 15 on the conduit portion 29.

The arm or float member 15 is also provided with an opening 32 in the underside of sleeve 16 which communicates with chamber 19 and provides for the free movement of water into and out of the chamber. A passage 33 extends through plug element 17 adjacent to the lower side of sleeve 16 to further provide a vent opening from chamber 19 for the intermittent escape of gas from the chamber.

In the operation of the bobbing mechanism, air or other gas under a relatively slight pressure flows at a generally constant rate from reservoir 24 into chamber 19. The gas entering chamber 19 displaces water from the chamber and forms a bubble or pocket of gas which buoys the pivotal arm 15 upwardly. As the pocket of gas increases in size, arm 15 becomes more buoyant and continues to pivot upwardly and the relative position of the pocket of gas slips outwardly within the chamber as the gas constantly seeks higher levels in the chamber. After the arm 15 has been buoyed upwardly to a given position and the pocket of gas has reached a given size and has shifted in accordance with pivotal movement of the arms, the vent passage 33 will be exposed to the pocket of gas and a portion of the gas will be vented from the chamber and will be displaced by water. Thereupon arm 15 experiences a corresponding loss in buoyancy and pivots downwardly to a generally predetermined lower position under its own weight and the weight it carries including the line sinker 34 and the process of gas pocket formation begins anew. With gas constantly entering chamber 19 the process of gas pocket formation with subsequent venting of a portion of the gas will be repetitive to provide for continuous oscillation of the arm or float member 15 to thereby bob the fishing line.

Since the arm or float member 15 will pivot downwardly from its uppermost bobbing position as soon as its weight and the weight it carries exceeds the buoyant effect of the gas pocket being vented, some gas remains trapped in the member and is immediately added to by the constant gas supply. Thus, downward travel of the arm 15 is interrupted at a generally predetermined position when the buoyant effect of the gas pocket again exceeds the indicated weight. Since some gas remains trapped in the downwardly pivoting arm, it is not necessary to replace the entire gas pocket with each oscillation of the arm. Thus, each bobbing oscillation of arm 15 actually requires only a relatively small amount of additional gas.

While the speed of oscillation of arm 15 will of course be influenced by many factors including its own weight and the weight it carries, it should be noted that the gas supply to chamber 19 may be regulated by valve 26 to vary the speed of oscillation as desired. The reservoir supply will be unduly taxed and regulation of the speed of oscillation will be more difficult if arm 15 and the weight it carries are relatively heavy. In order to provide for many hours of continuous operation from a single reservoir supply and to attain conditions for better regulation of the speed of oscillation of arm 15, it is generally preferred that the arm or float member 15 be as light as possible. To this end it is generally preferred that the sleeve 16 be fabricated from a light plastic material and the plug elements 17 and 18 of cork or a light wood or plastic material. The plug 17 may even be hollow as best shown in FIG. 2. With a very buoyant arm 15 and proper selection of line sinker 34, gas can enter chamber 19 at a relatively slow rate to provide an advantageous speed of bobbing oscillation and the reservoir supply will be adequate for many hours of operation.

In the embodiment of FIGURE 5, a single opening 35 communicates with chamber 19 and is provided in the underside of sleeve 16 adjacent to the plug element 17. The single opening is adapted to provide for the free movement of water into and out of chamber 19 and also serves as the vent passage for the intermittent escape of gas from the chamber. Opening 35 is therefore a substitute for and performs the function of both openings 32 and 33 of the embodiment of FIG. 2.

The automatic bobbing mechanism of this invention is simple, reliable and of low operating cost. It is ordinarily not subject to fouling by formation of ice in the fishing hole, for the intermittent release or escape of gas from arm 15 generally provides enough agitation of the water to prevent ice formation in the hole. Once the ice fishing apparatus with the bobbing mechanism of this invention is placed in service, it requires but little attention from the fisherman who would be free to remain at some distance, in his shelter or otherwise, until such time as the apparatus signals a catch.

Various modes of carrying out the invention are contemplated as being within the scope of the following claims particularly pointing out and distinctly claiming the subject matter which is regarded as the invention.

I claim:

1. In a fishing device equipped with a fishing line, support means extending beneath the surface of the water, a float connected to the support means for oscillatory pivotal movement in the water relative to the support means and including a flotation chamber, means on said float to carry the fishing line to effect bobbing of the line upon oscillatory pivotal movement of said float, a source of gas, and means for continuously introducing gas from said source into the chamber to buoy the float upwardly, said chamber having means to release at least a portion of the gas from said chamber after the float has been buoyed upwardly to a predetermined position and to displace the released gas with water whereupon said float loses some of its buoyancy and pivots downwardly to a lowered position, the continuous flow of gas into the chamber with intermittent release of gas from the chamber providing for oscillation of the float to bob the fishing line.

2. In a fishing device equipped with a fishing line, a support member having at least a part thereof extending beneath the surface of the water, an arm pivotally connected to the support member for pivotal movement in the water and having a chamber therein, means on said arm to carry the fishing line to effect raising and lowering of the line upon oscillatory pivotal movement of said arm, a source of gas under pressure, and means for continuously introducing gas from said source into the chamber within said arm to buoy the arm upwardly, said chamber having means to release the gas from said chamber after the arm has been buoyed upwardly to a predetermined position and to displace the released gas with water whereupon said arm loses some of its buoyancy and pivots downwardly to a lowered position, the continuous flow of gas into the chamber with intermittent release of gas from the chamber providing for continuous oscillation of the pivotal arm to thereby bob the fishing line.

3. In an ice fishing apparatus, a support member adapted to extend into the water through a fishing hole in the ice, means to support said member relative to the fishing hole, an arm pivotally connected to the support member at a location beneath the surface of the water for pivotal movement in the water and having a chamber therein, a rotary line-equipped reel mounted on the support member at a location above said pivotal arm, means on said arm to carry the fishing line to effect raising and lowering of the line upon oscillatory pivotal movement of said arm, a source of gas under pressure, and means for continuously introducing gas from said source into the chamber within said arm to buoy the arm upwardly, said chamber having means to release the gas from said chamber after the arm has been buoyed upwardly to a predetermined position and to displace the released gas with water whereupon said arm loses some of its buoyancy and pivots downwardly to a lowered position, the continuous flow of gas into the chamber with intermittent release of gas from the chamber providing for continuous oscillation of the arm to thereby bob the fishing line.

4. The invention of claim 3 wherein the means to release gas from the chamber and to displace the released gas with water comprises a single opening located so as to become accessible to the gas in the chamber when the pivotal arm is buoyed upwardly to a predetermined position.

5. The invention of claim 3 wherein the means to release gas from the chamber and to displace the released gas with water comprise a plurality of spaced openings.

6. The invention of claim 3 wherein the source of gas under pressure is secured to the support member.

7. The invention of claim 3 wherein the means to support the support member comprises a hollow cross arm which is fillable with a gas under pressure to provide a pressure source for operating the pivotal arm.

8. In an ice fishing apparatus, a support member adapted to extend into the water through a fishing hole in the ice, means to support said member relative to the fishing hole, an arm pivotally connected to the support member at a location beneath water level for pivotal movement in the water and having a chamber therein, a rotary line-equipped reel mounted on the support member at a location above said pivotal arm, means to releasably secure the fishing line on the pivotal arm at a location spaced from the pivotal connection and being releasable in response to a pull on the line by a fish, said arm having passage means communicating with the lower portion of the chamber for free movement of water into and out of the chamber, and a source of gas under pressure communicating with said chamber wherein gas from said source forms a movable pocket seeking the highest level within the chamber and displaces water from the chamber to buoyantly pivot the pivotal arm upwardly, said arm having second passage means forming a vent communicating with said chamber and being located so as to become accessible to the gas pocket when the pivotal arm is buoyed upwardly to a predetermined position, a portion of said pocket of gas escaping from the chamber through said vent when the pivotal arm reaches said predetermined position whereupon said arm loses some of its buoyancy and pivots downwardly to a lower position, the process of gas pocket formation and subsequent escape being repetitive to effect continuous oscillation of the pivotal arm and thereby bob the fishing line without need for an attendant.

9. The invention of claim 8 wherein the means for releasably securing the fishing line on the pivotal arm comprises a tubular member supported by the pivotal arm and having the fishing line extending therethrough, and a pin member projecting from the pivotal arm beneath the longitudinal plane containing the pivot axis of said arm, the fishing line exit end of the tubular member being flexible and adapted to slide onto the pin member with a force fit which is capable of securing the line to withstand the repetitive bobbing motion of the arm and is releasable in response to a pull exerted on the line by a fish.

10. The invention of claim 8 wherein the support member includes flexible signal means having one end fixedly secured to the support member, means on the support member to releasably secure the other end of the signal means, and means operable by rotation of the reel for releasing said other end of the signal means from the releasable securement means, said reel being rotatable to actuate said signal means in response to the force exerted on the line by a fish.

References Cited in the file of this patent

UNITED STATES PATENTS

| | | |
|---|---|---|
| 1,292,618 | Lazelle | Jan. 28, 1919 |
| 2,320,145 | La Due | May 25, 1943 |
| 2,805,511 | Cicala | Sept. 10, 1957 |
| 2,814,898 | Fluke et al. | Dec. 3, 1957 |
| 2,834,140 | Knier | May 13, 1958 |
| 2,932,916 | Strickland | Apr. 19, 1960 |

FOREIGN PATENTS

| | | |
|---|---|---|
| 677,900 | France | Dec. 19, 1929 |